United States Patent
Kim et al.

(10) Patent No.: US 8,218,510 B2
(45) Date of Patent: Jul. 10, 2012

(54) RELAY STATION AND METHOD OF OPERATING THE SAME

(75) Inventors: Byoung Hoon Kim, Anyang-si (KR); Han Byul Seo, Anyang-si (KR); Young Seob Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 589 days.

(21) Appl. No.: 12/432,443

(22) Filed: Apr. 29, 2009

(65) Prior Publication Data

US 2010/0054173 A1    Mar. 4, 2010

Related U.S. Application Data

(60) Provisional application No. 61/093,783, filed on Sep. 3, 2008.

(30) Foreign Application Priority Data

Oct. 9, 2008 (KR) .................. 10-2008-0098906

(51) Int. Cl.
*H04J 3/00* (2006.01)
(52) U.S. Cl. .................. 370/337; 370/347; 370/321
(58) Field of Classification Search .................. 370/350, 370/337, 347, 321
See application file for complete search history.

(56) References Cited

U.S. PATENT DOCUMENTS

| | | | | |
|---|---|---|---|---|
| 6,215,831 B1 * | 4/2001 | Nowack et al. | ............ | 375/340 |
| 7,055,090 B2 * | 5/2006 | Kikuchi et al. | ............ | 714/801 |
| 7,483,497 B2 * | 1/2009 | Oh et al. | ............ | 375/341 |
| 2001/0003208 A1 * | 6/2001 | Wan | ............ | 714/800 |
| 2003/0043928 A1 | 3/2003 | Ling et al. | | |
| 2004/0252837 A1 * | 12/2004 | Harvey et al. | ............ | 380/270 |
| 2006/0171483 A1 * | 8/2006 | Jia et al. | ............ | 375/267 |
| 2008/0045212 A1 | 2/2008 | Kim et al. | | |
| 2008/0181318 A1 | 7/2008 | Kim et al. | | |
| 2009/0268854 A1 * | 10/2009 | Odoni et al. | ............ | 375/341 |

FOREIGN PATENT DOCUMENTS

KR    10-2008-0017629 A    2/2008

* cited by examiner

*Primary Examiner* — Ricky Ngo
*Assistant Examiner* — Dewanda Samuel
(74) *Attorney, Agent, or Firm* — Birch, Stewart, Kolasch & Birch, LLP (57) ABSTRACT

A relay station and a method of operating a relay station are disclosed. The method includes decoding a received signal to restore the received signal into an information packet, and obtaining a first probability sequence representing probability information of respective information bits constituting the information packet, encoding the information packet to obtain a coded packet, and obtaining a second probability sequence representing probability information of respective coded bits constituting the coded packet by using the first probability sequence, and obtaining a modulated symbol by using the second probability sequence.

7 Claims, 11 Drawing Sheets

RELAY STATION AND METHOD OF OPERATING THE SAME

CROSS-REFERENCE TO RELATED APPLICATIONS

This application claims the benefit of priority of U.S. Provisional Application No. 61/093,783 filed on Sep. 3, 2008, and Korean Patent Application No. 2008-0098906 filed on Oct. 9, 2008, which are incorporated by reference in their entirety herein.

BACKGROUND

1. Field of the Invention

The present invention relates to wireless communications, and more particularly, to a method of operating a relay station in a wireless communication system.

2. Related Art

Institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 (hereinafter, IEEE 802.16e) was completed in 2005 in a format of 'corrigendum'.

Recently, in the IEEE 802.16 Task Group j (hereinafter, IEEE 802.16j) based on IEEE 802.16e, a relay station (RS) is introduced to provide coverage extension and throughput enhancement, and a standardization thereof is being carried out. According to the IEEE 802.16j specification, a signal can be delivered to a mobile station (MS) located outside a coverage of a base station (BS) via the RS, and a high-quality path employing high-level adaptive modulation and coding (AMC) can be configured for an MS located inside the coverage of the BS, thereby increasing system capacity with the same radio resource.

A representative operation mode of the RS includes a decode-and-forward (DF) mode and an amplify-and-forward (AF) mode. According to the DF mode, a wireless RS restores transmission information by performing various processes (e.g., demodulation, channel decoding, error checking, etc.) on a signal received from a source station, and thereafter delivers a signal generated by channel coding and modulation to a destination station. According to the AF mode, the wireless RS amplifies a signal received from the source station, and thereafter delivers the amplified signal to the destination station.

The DF mode has a merit in that noise can be removed, and reliability of signal transmission can be increased since errors can be checked. Further, a channel coding and modulation scheme can be modified by the RS. However, the DF mode also has a demerit in that a time delay may occur. On the other hand, the AF mode has a merit in that an operation of the RS is simple, and a time delay can be reduced. However, the AF mode also has a demerit in that noise included in a signal cannot be removed, and errors cannot be checked.

Figure 1:
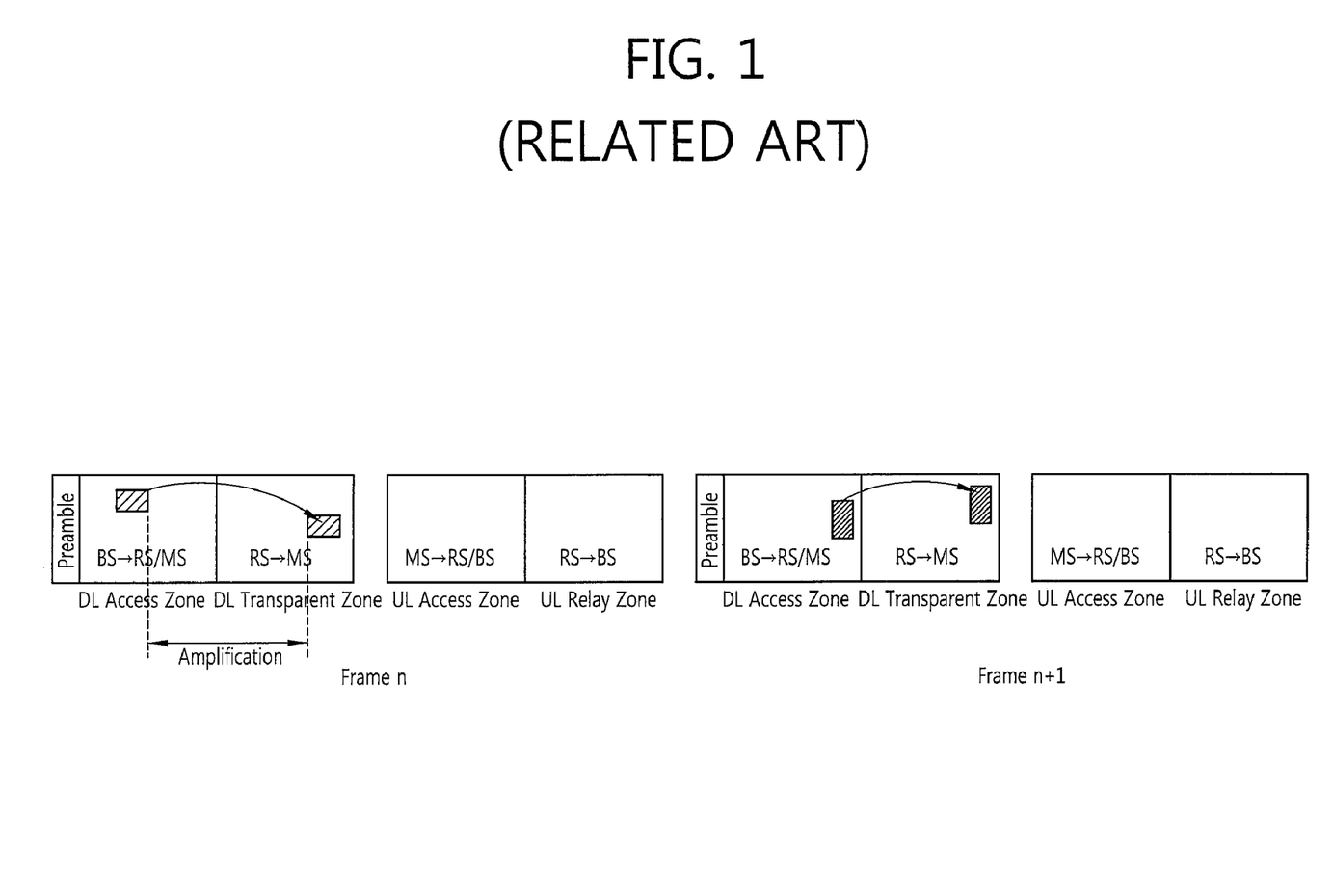
FIG. 1 shows a relay process according to an amplify-and-forward (AF) mode.
Figure 2:
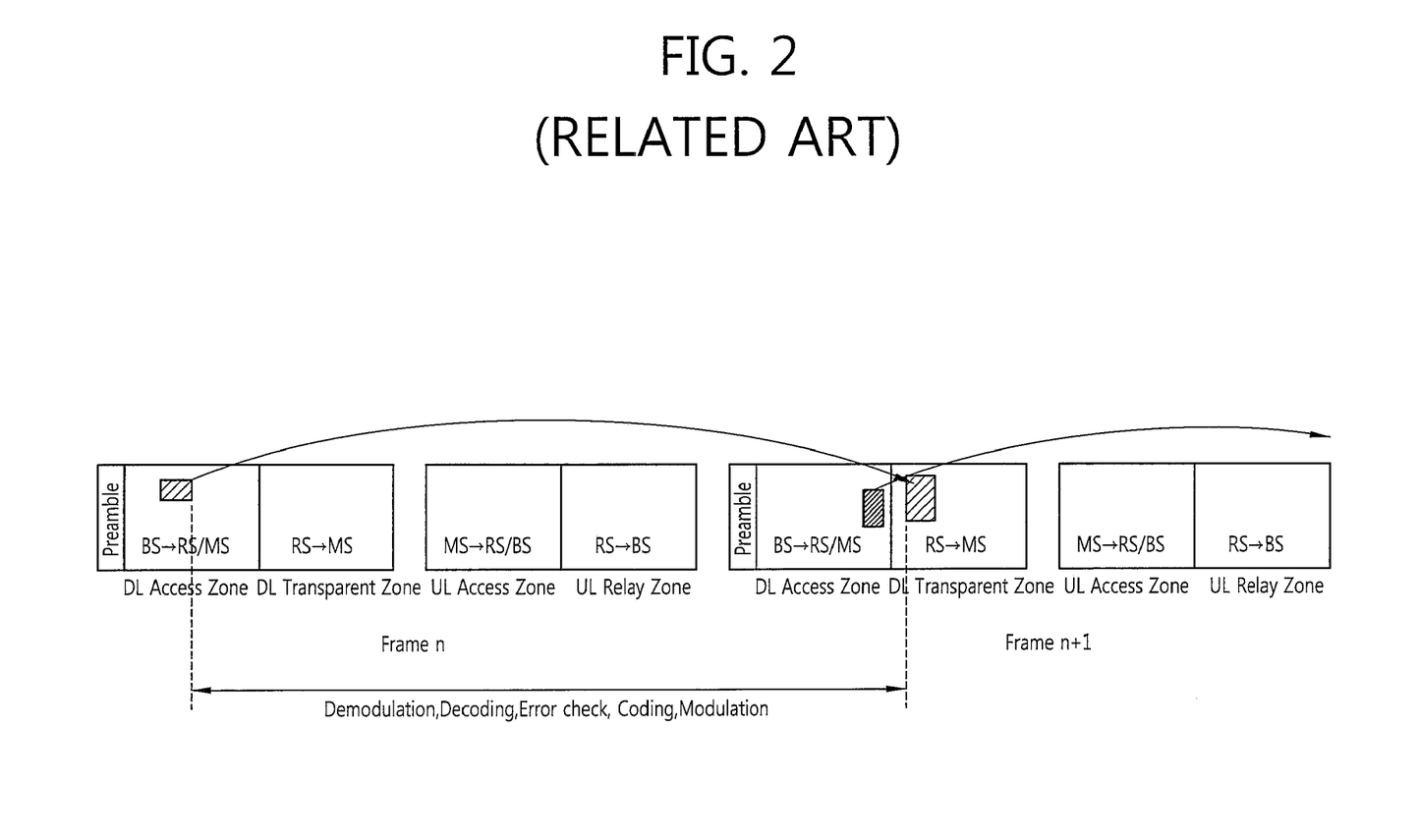
FIG. 2 shows a relay process according to a decode-and-forward (DF) mode.

FIG. 1 shows a relay process according to an AF mode. FIG. 2 shows a relay process according to a DF mode. A transparent mode of IEEE 802.16j is used herein as an example.

Referring to FIG. 1 and FIG. 2, a frame n is temporally prior to a frame n+1. One frame includes a downlink (DL) region and an uplink (UL) region. The DL region includes a DL access zone and a DL transparent zone. The UL region includes a LL access zone and a UL relay zone. The DL access zone is a region where a base station (BS) transmits a signal to a relay station (RS) or a mobile station (MS). The DL transparent zone is a region where the RS transmits a signal to the MS. The UL access zone is a region where the MS transmits a signal to the RS or the BS. The UL relay zone is a region where the RS transmits a signal to the BS.

In FIG. 1, when the BS delivers a signal to the RS on the DL access zone of the frame n, the RS delivers a signal to the MS on the DL transparent zone of the frame n. Further, when the BS delivers a signal to the RS on the DL access zone of the frame n+1, the RS delivers a signal to the MS on the DL transparent zone of the frame n+1. As such, according to the AF mode, the RS receives a signal from the BS, and delivers the signal to the MS after only amplifying the signal. Thus, the signal can be delivered within the same frame without an additional time delay.

In FIG. 2, when the BS delivers a signal to the RS on the DL access zone of the frame n, the RS delivers a signal to the MS through the DL transparent zone of the frame n+1. As such, according to the DF mode, the RS performs modulation, decoding, and error checking on a signal received from the BS and thereafter performs coding and modulation, which leads to occurrence of an additional time delay. In addition, a size of signal may differ since a coding and modulation scheme changes.

To compensate for the aforementioned characteristics of the AF mode and the DF mode, there is an attempt to use the AF mode and the DF mode in combination with each other. For example, in a hybrid AF/DF scheme, a signal received by the RS is subjected to an information recovery process, and thereafter, if the recovery is successful, the signal is delivered according to the DF mode, and if the recovery is unsuccessful, the signal is delivered according to the AF mode. In this manner, a destination station can reduce a probability of reception errors by properly combining a signal received according to the AF mode with a signal retransmitted according to a hybrid automatic repeat request (HARQ) scheme or signals received through other paths.

The hybrid AF/DF scheme assumes that a modulation and coding scheme (MCS) level applied to a source station-relay (S-R) link is identical to an MCS level applied to a relay-destination station (R-D) link. However, in general, a channel condition of the S-R link is not identical to a channel condition of the R-D link. Therefore, different MCS levels may be applied to the S-R link and the R-D link, and allocation may be made by differentiating an amount of resources (e.g., bandwidth).

The hybrid AF/DF scheme is not effective when an applied MCS level and an amount of allocated resources are different in the two links. This is because the destination station prepares decoding according to an MCS level predefined for the R-D link, and thus cannot decode a signal received according to the AF mode. To deal with such a problem, the IEEE 802.16j standard specifies that a signal unsuccessfully received by the RS is discarded instead of being delivered to the destination station. However, this implies that resources pre-allocated to the R-D link are wasted when an error occurs in the S-R link.

SUMMARY

The present invention provides a method in which an RS transmits a signal, which is received from a source station, to a destination station.

The present invention also provides a method in which an RS transmits a signal to a destination station when an MCS level and an amount of allocated resources are different in an S-R link and an R-D link.

In an aspect, a method of operating a relay station in a wireless communication system is provided. The method includes decoding a received signal to restore the received signal into an information packet, and obtaining a first probability sequence representing probability information of respective information bits constituting the information packet, encoding the information packet to obtain a coded packet, and obtaining a second probability sequence representing probability information of respective coded bits constituting the coded packet by using the first probability sequence, and obtaining a modulated symbol by using the second probability sequence.

The modulated symbol may be obtained by using a probability of a constellation point according to a modulation scheme predefined between the relay station and a destination station. The modulated symbol may be obtained by summing values obtained by multiplying coordinates of respective constellation points by the probabilities of the respective constellation points. If a distance between a single constellation point and a sum of values obtained by multiplying coordinates of respective constellation points by the probabilities of the respective constellation points is less than or equal to a specific value, the single constellation point may be selected as the modulated symbol.

In another aspect, a method of operating a relay station in a wireless communication system is provided. The method includes decoding received signal to restore the received signal into an information packet consisting of information bits, selecting at least one suspicious bit from the information bits, obtaining a first probability sequence representing probability information of the suspicious bit and remaining information bits other than the suspicious bit, encoding the information packet to obtain a coded packet and obtaining a second probability sequence representing probability information of respective coded bits constituting the coded packet by using the first probability sequence, and obtaining a modulated symbol by using the second probability sequence.

The suspicious bit may be an information bit of which a difference between a probability of the bit being 0 and a probability of the bit being 1 is less than or equal to a specific value, or a specific number of information bits of which a difference between a probability of the bit being 0 and a probability of the bit being 1 is smallest. In the probability information of the information bit, a probability of the suspicious bit being 0 and a probability of the suspicious bit being 1 may be respectively 0.5, and, as for the remaining information bits other than the suspicious bit, a higher probability between a probability of being 0 and a probability of being 1 may be set to 1.

In still another aspect, a relay station of a wireless communication system includes a decoder configured to decode a received signal to restore the received signal into an information packet, and to obtain a first probability sequence representing probability information of respective information bits constituting the information packet, an encoder configured to encode the information packet to obtain a coded packet, and to obtain a second probability sequence representing probability information of respective coded bits constituting the coded packet by using the first probability sequence, and a modulator configured to obtain a modulated symbol by using the second probability sequence.

In still another aspect, a method of operating a relay station in a wireless communication system is provided. The method includes decoding a received signal to restore the received signal into a first information packet consisting of information bits, generating at least one second information packet by inverting some or all of suspicious bits included in the information bits, encoding each of the first information packet and the second information packet(s) to generate a plurality of coded packets, and modulating the plurality of coded packets to generate a plurality of modulated symbols and obtaining an average of the plurality of modulated symbols.

A relay station can properly deliver a signal to a destination station when the relay station receives an erroneous signal from a source station, when an error detection of a signal received from the source station is not possible, and when a result of error detection is not reliable. In particular, when a modulation and coding scheme (MCS) level is different between a source station-relay (S-R) link and a relay-destination station (R-D) link, a probability of error recovery can be increased by applying the different MCS level. In addition, when resources are pre-allocated to the R-D link, resources of the R-D link can be utilized even if an error occurs in the S-R link, thereby avoiding waste of resources.

DESCRIPTION OF EXEMPLARY EMBODIMENTS

Figure 3:
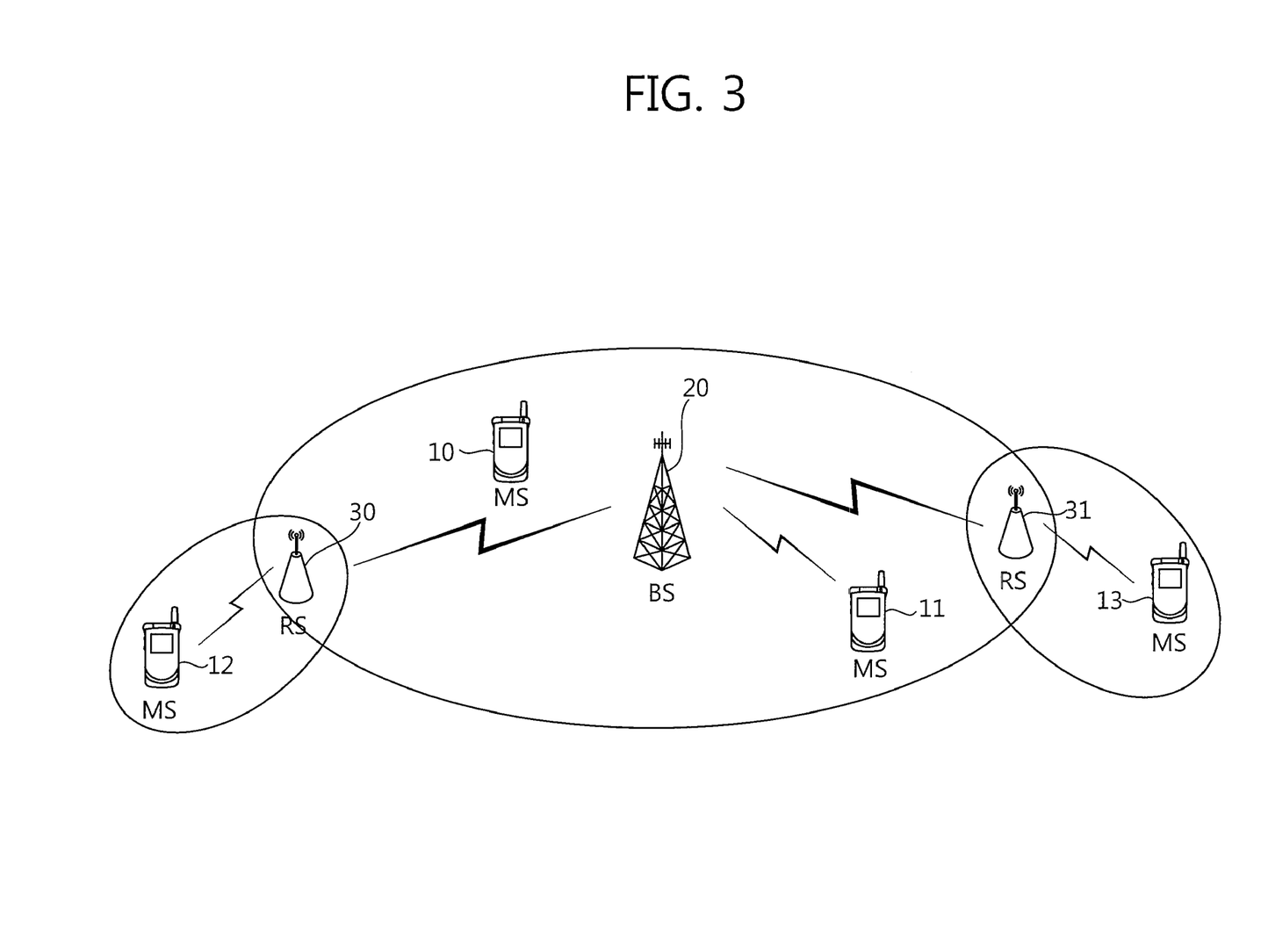
FIG. 3 is a diagram showing a wireless communication system using a relay station.

FIG. 3 is a diagram showing a wireless communication system using a relay station. The wireless communication system can be widely deployed to provide a variety of communication services, such as voices, packet data, etc.

Referring to FIG. 3, the wireless communication system includes mobile stations (MSs) 10, 11, 12, and 13, a base station (BS) 20, and relay stations (RSs) 30 and 31. Each of the MSs 10, 11, 12, and 13 may be fixed or mobile, and may be referred to as another terminology, such as a user equipment (UE), a user terminal (UT), a subscriber station (SS), a wireless device, etc. The BS 20 is generally a fixed station that communicates with the MSs 10, 11, 12, and 13 and may be referred to as another terminology, such as a node-B (NB), a base transceiver system (BTS), an access point, etc. One BS 20 may include one or more cells. The RSs 30 and 31 are provided for coverage extension or data rate improvement resulted from a diversity effect, and are located between the MS and the BS. That is, the MSs 10 and 11 located inside a coverage of the BS 20 can directly communicate with the BS 20, and the MSs 12 and 13 located outside the coverage of the BS 20 communicate with the BS 20 via the RSs 30 and 31. Alternatively, for the data rate improvement resulted from the diversity effect, even the MSs 10 and 11 located inside the coverage of the BS 20 may communicate with the BS 20 via the RSs 30 and 31.

Downlink (DL) denotes a communication link from the BS 20 to the MS 10, and uplink (UL) denotes a communication link from the MS 10 to the BS 20. Thus, in DL, the BS 20 is a source station and the MS 10 is a destination station, and in UL, the MS 10 is the source station and the BS 20 is the destination station. In DL, a transmitter may be a part of the BS 20, and a receiver may be a part of the MS 10. In UL, the transmitter may be a part of the MS 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

Figure 4:
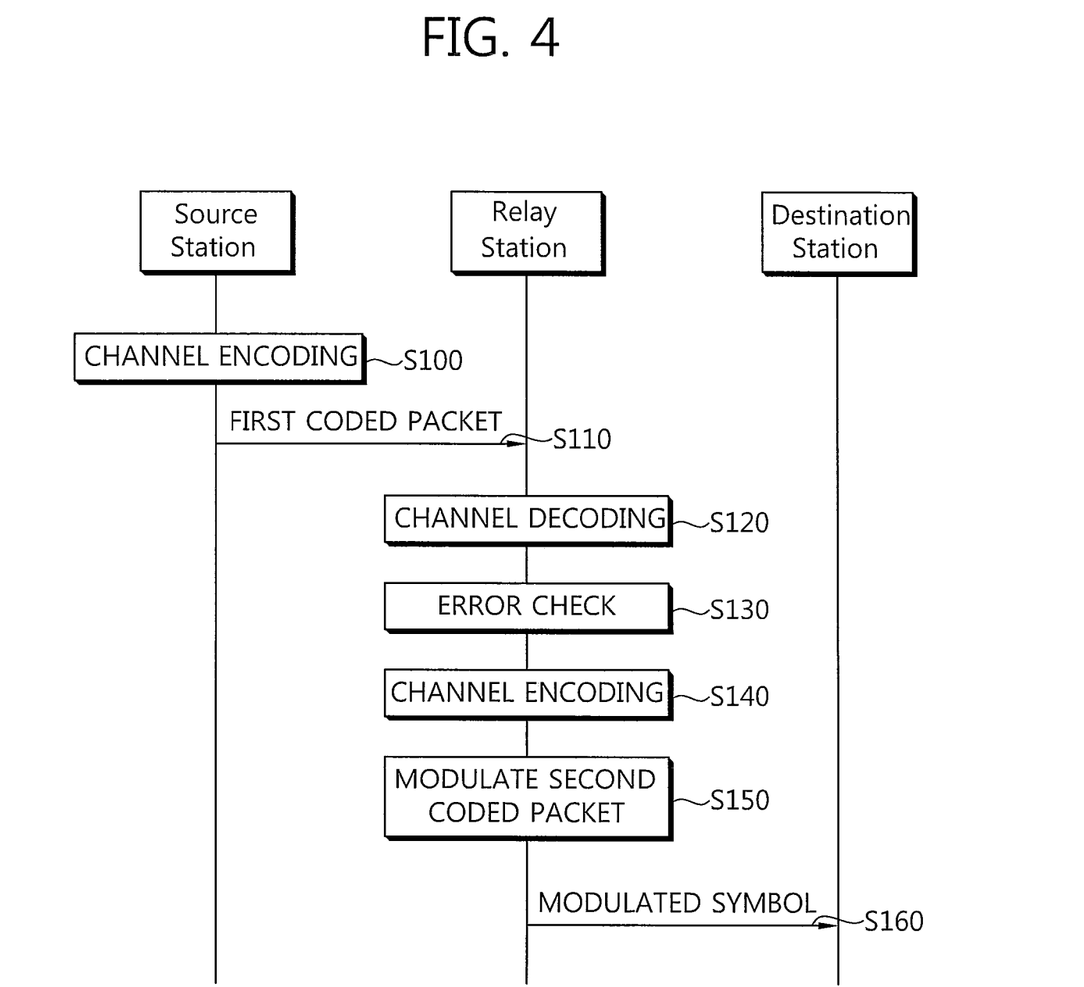
FIG. 4 is a flow diagram showing an exemplary procedure in which a signal is delivered from a source station to a destination station via a relay station.

FIG. 4 is a flow diagram showing an exemplary procedure in which a signal is delivered from a source station to a destination station via a relay station (RS).

Referring to FIG. 4, the source station performs channel encoding on an information packet consisting of information bits representing information to be delivered to the destination station (step S100). By the channel encoding process, the information packet is converted into a first coded packet consisting of coded bits.

The source station transmits the first coded packet to the RS (step S110).

Upon receiving the first coded packet from the source station, the RS performs channel decoding on the first coded packet (step S120). The first coded packet is restored into an information packet by the channel decoding process.

The RS performs error checking on the information packet restored in step S120 (step S130). Herein, parity checking, cyclic redundancy checking (CRC), header checksum, etc., can be used for error checking of the information packet.

If it is determined that there is no error in step S130, the RS performs channel encoding on the information packet (step S140). It is assumed herein that an encoder for performing channel encoding in step S100 is different from an encoder for performing channel encoding in step S140. By the channel encoding process, the information packet is converted into a second coded packet consisting of coded bits.

The RS modulates the second coded packet (step S150), and transmits a modulated symbol to the destination station (step S160).

If the RS receives an erroneous signal, an operation of the RS is problematic. For such a situation, various methods have been proposed, e.g., a method in which the RS does not deliver the received signal to the destination station, a method in which the RS delivers the received signal to the destination station according to the AF mode, etc. However, the method in which the RS does not deliver the received signal to the destination station results in waste of resources pre-allocated between a relay-destination station (R-D) link. In addition, the method in which the RS delivers the received signal to the destination station according to the AF mode is not effective since an MCS level and an amount of allocated resources are different between a source station-relay (S-R) link and the R-D link. Although an operation of the RS which receives the erroneous signal will be described hereinafter, the present invention is not limited to the case where the erroneous signal is received. That is, the present invention may apply in various situations, for example, when an error detection of a received signal is not possible, when a result of error detection is not reliable, when a signal is to be transmitted according to the AF mode, etc.

Figure 5:
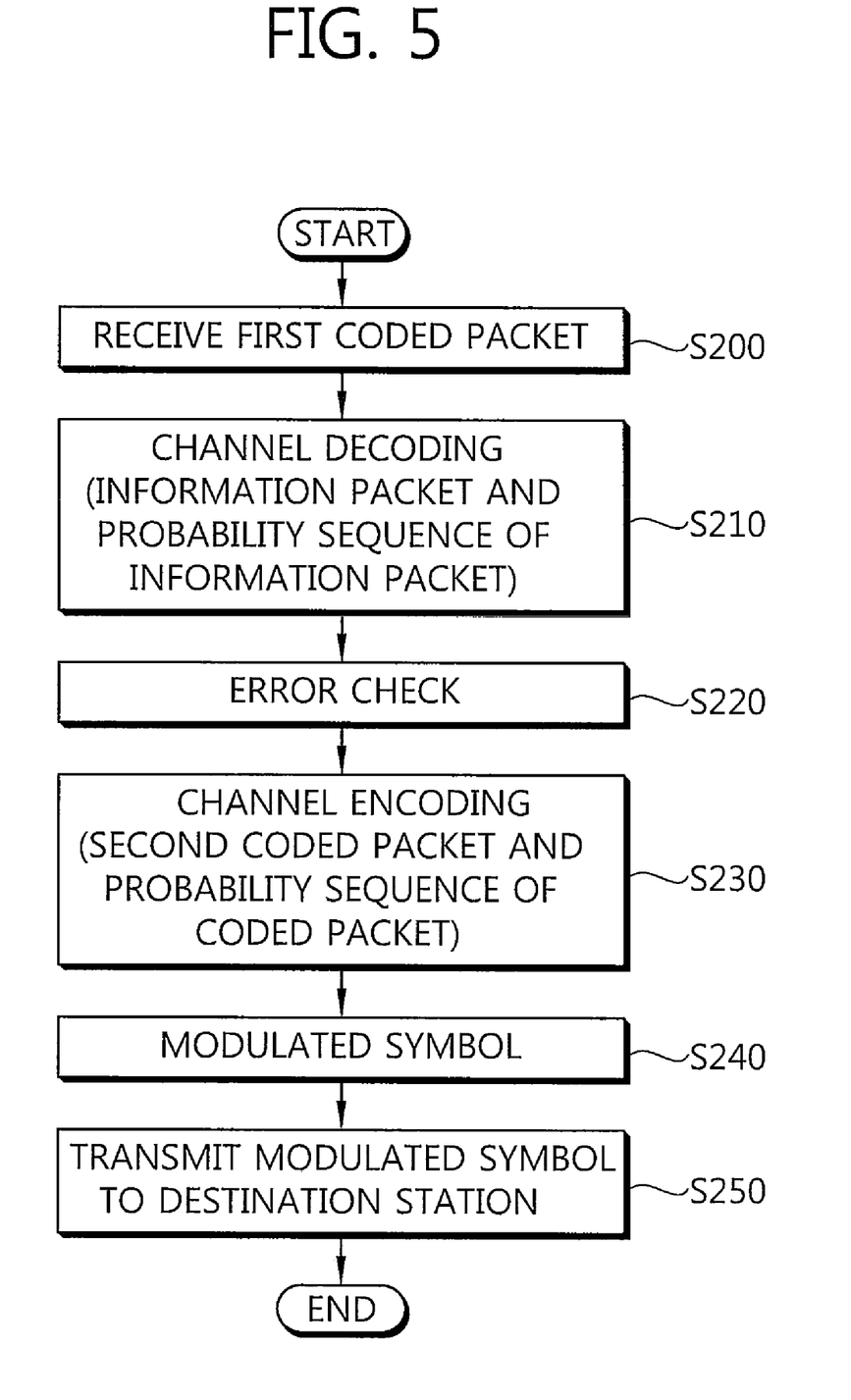
FIG. 5 is a flowchart showing an operation of a relay station according to an embodiment of the present invention.

FIG. 5 is a flowchart showing an operation of an RS according to an embodiment of the present invention.

Referring to FIG. 5, the RS receives a first coded packet from a source station (step S200), and performs channel decoding on the first coded packet (step S210). By the channel decoding process, the first coded packet is restored into an information packet consisting of information bits. In addition, the channel decoding process can be used to obtain a probability sequence (i.e., a first probability sequence) of the information packet representing probability information of respective information bits constituting the information packet. The probability information denotes a probability of each information bit being 0 or 1, and can be expressed by a log likelihood ratio (LLR) which is the logarithm of a ratio of a probability of each information bit being 0 and a probability of each information bit being 1.

Next, an error of the information packet restored in step S210 is checked (step S220). Herein, parity checking, cyclic redundancy checking (CRC), header checksum, etc., can be used for error checking of the information packet.

Next, the RS performs channel encoding on the information obtained in step S210 (step S230). A second coded packet can be obtained by the channel encoding process. Further, a probability sequence of the information packet may be used to obtain a probability sequence (i.e., a second probability sequence) of the second coded packet representing probability information of respective coded bits constituting the second coded packet. A detailed method of obtaining the probability sequence of the second coded packet by using the probability sequence of the information packet will be described below.

Next, the RS obtains each modulated symbol to be transmitted in every transmission time by using the probability sequence of the second coded packet obtained in step S230 (step S240). For example, the modulated symbol can be obtained by grouping probability sequences of the second coded packet according to a modulation scheme of the R-D link and then by calculating a probability of each constellation point. In addition, the modulated symbol can be obtained by puncturing, repeating, re-ordering the probability sequences of the second coded packets on the basis of rate matching and interleaving, and thereafter by grouping the probability sequences according to the modulation scheme of the R-D link, and then by calculating the probability of each constellation point. A detailed method of obtaining the modulated symbol will be described below.

Next, the RS transmits each modulated symbol obtained in step S240 in every transmission time (step S250).

According to FIG. 5, in order for a signal received from the source station to be delivered to the destination station, the RS generates a modulated symbol according to a result of using a probability instead of a result of hard decision, thereby increasing reliability of error recovery. In addition, since the RS transmits to the destination station a modulated symbol suitable to a predefined MCS level and an amount of pre-allocated resources, the destination station can easily decode and restore the received signal.

Hereinafter, an example of obtaining a probability sequence of a coded packet by using a probability sequence of an information packet will be described.

Figure 6:
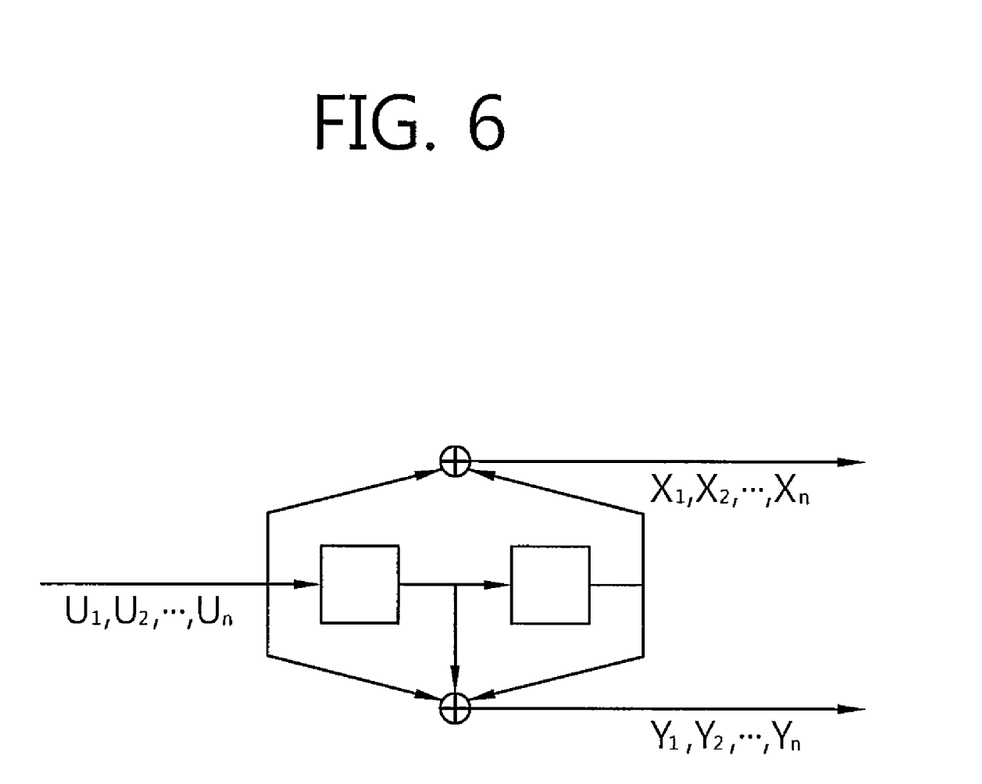
FIG. 6 shows an example of a convolution encoder having a rate of 1/2.
Figure 7:
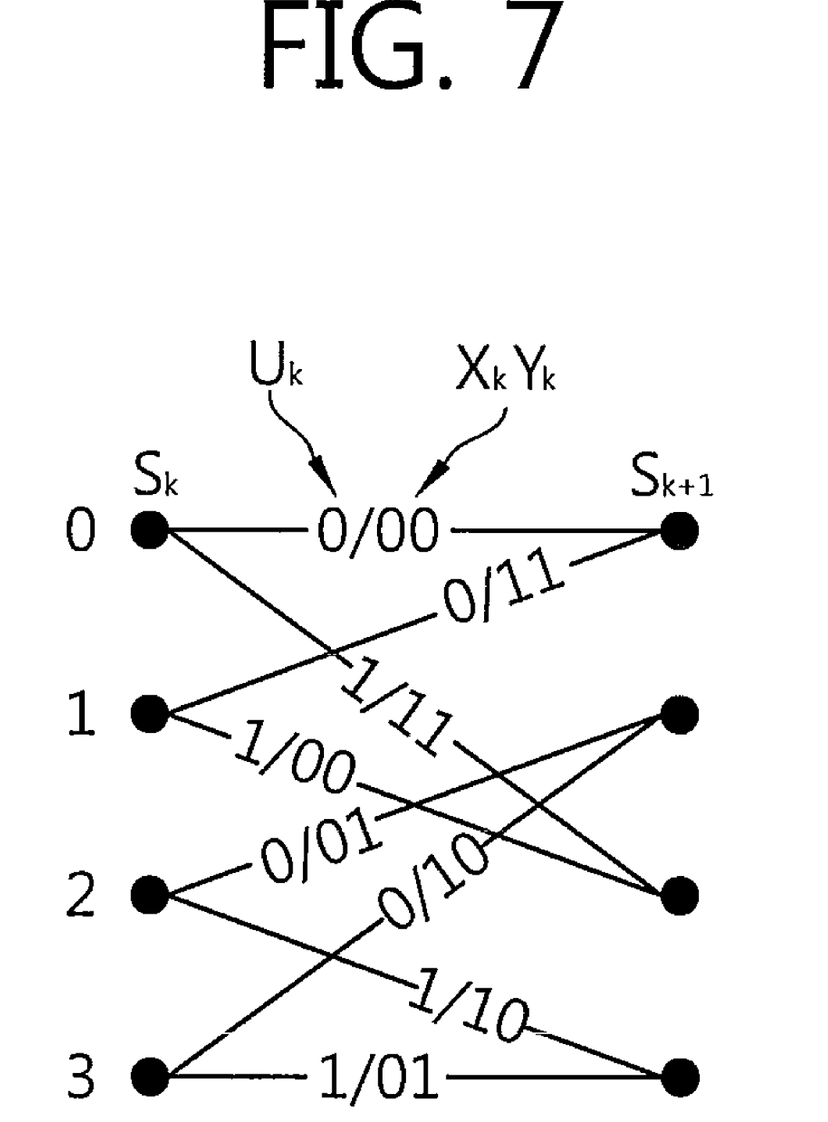
FIG. 7 shows a trellis according to a convolution encoder of FIG. 6.

FIG. 6 shows an example of a convolution encoder having a rate of 1/2. FIG. 7 shows a trellis according to the convolution encoder of FIG. 6. It is assumed that an RS uses the convolution encoder of FIG. 6 to deliver a signal to an R-D link.

Referring to FIG. 6, $U_1, U_2, \ldots, U_n$ denote inputs of the convolution encoder. $X_1, X_2, \ldots, X_n$ and $Y_1, Y_2, \ldots, Y_n$ denote outputs of the convolution encoder. A coded packet is expressed by $X_1, Y_1, X_2, Y_2, \ldots, X_n, Y_n$. Referring to FIG. 7, $U_k$ denotes a $k^{th}$ information bit, $X_k$ and $Y_k$ denote two coded bits corresponding to $U_k$, and $S_k$ denotes a $k^{th}$ state of a convolution code that changes according to an input. In FIG. 7, a state $S_{k+1}$ transitions to 0 when a previous state $S_k$ is 0 and a previous input $U_k$ is 0 or when the previous state $S_k$ is 1 and the previous input $U_k$ is 0.

The input of the convolution encoder is a probability that each information bit constituting the information packet is 0 or 1. A probability of the state that changes according to the input can be obtained using the probability sequences of the information packet and Equation 1 below.

$P(S_0=w)=1$, if $w$ is an initial state.

$P(S_0=w)=0$, otherwise.

$P(S_k=0)=P(S_{k-1}=0) \cdot P(U_{k-1}=0)+P(S_{k-1}=1) \cdot P(U_{k-1}=0)$ $P(S_k=1)=P(S_{k-1}=2) \cdot P(U_{k-1}=0)+P(S_{k-1}=3) \cdot P(U_{k-1}=0)$ $P(S_k=2)=P(S_{k-1}=0) \cdot P(U_{k-1}=1)+P(S_{k-1}=1) \cdot P(U_{k-1}=1)$ $P(S_k=3)=P(S_{k-1}=2) \cdot P(U_{k-1}=1)+P(S_{k-1}=3) \cdot P(U_{k-1}=1)$  [Equation 1]

In addition, the probability sequences of the coded packet can be obtained using the probability sequences of the information packet and the probability of each state obtained by Equation 1 above. Equation 2 below expresses a method of obtaining coded bits $X_k$ and $Y_k$ constituting the probability sequences of the coded packet.

$$P(X_k = 0) = P(S_k = 0) \cdot P(U_k = 0) + \\ P(S_k = 1) \cdot P(U_k = 1) + P(S_k = 2) \cdot P(U_k = 0) + \\ P(S_k = 3) \cdot P(U_k = 1) \longrightarrow P(X_k = 1) = 1 - P(X_k = 0)$$
$$P(Y_k = 0) = P(S_k = 0) \cdot P(U_k = 0) + \\ P(S_k = 1) \cdot P(U_k = 1) + P(S_k = 2) \cdot P(U_k = 1) + \\ P(S_k = 3) \cdot P(U_k = 0) \longrightarrow P(Y_k = 1) = 1 - P(Y_k = 0)$$
[Equation 2]

As such, the probability sequences of the coded packet can be obtained from the probability sequences of the information packet. Although the convolution encoder is used to obtain the probability sequences of the coded packet, this is for exemplary purposes only, and thus the present invention is not limited thereto. Those skilled in the art may obtain the probability sequences of the coded packet by using a low density parity check (LDPC) coder or a turbo coder according to the descriptions of the present invention.

Hereinafter, an example of obtaining a modulated symbol by using a probability sequence of a coded packet will be described.

Figure 8:
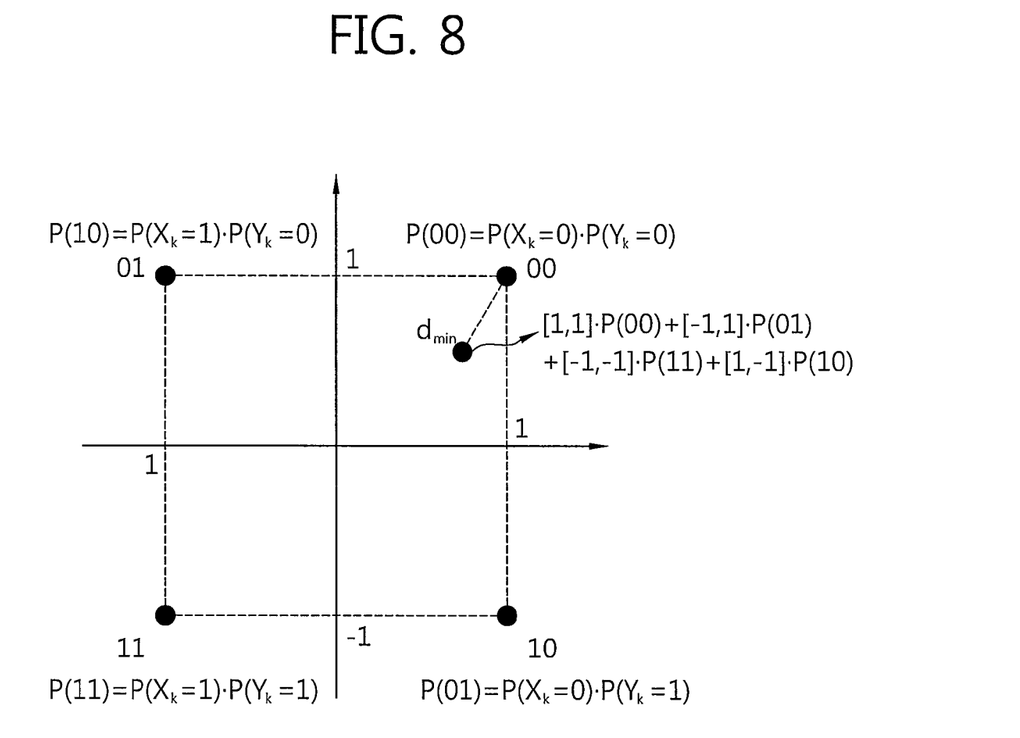
FIG. 8 shows a constellation based on a quadrature phase shift keying (QPSK) modulation scheme and a method of obtaining a modulated symbol according to an embodiment of the present invention.

FIG. 8 shows a constellation based on a quadrature phase shift keying (QPSK) modulation scheme and a method of obtaining a modulated symbol according to an embodiment of the present invention. Although the QPSK modulation scheme is used herein to obtain the modulated symbol, the present invention is not limited thereto. That is, a binary phase shift keying (BPSK), m-quadrature amplitude modulation (m-QAM), etc., may also be used to obtain the modulated symbol.

In the example of FIG. 8, the convolution encoder of FIG. 6 is used for the method of obtaining the modulated symbol from the probability sequence of the coded packet. It is assumed herein that, among coded bits constituting the coded packet, a probability of a (2k−1)-th coded bit being 1 is $P(X_k=1)$, and a probability of the (2k−1)-th coded bit being 0 is $P(X_k=0)$. Further, a probability of a 2k-th coded bit being 1 is $P(Y_k=1)$, and a probability of the 2k-th coded bit being 1 is 0 is $P(Y_k=0)$.

A modulated symbol to be transmitted at a first transmission time can be obtained using first and second coded bits included in the coded packet. Thus, under the assumption that the respective coded bits are independent from one another, probabilities of respective QPSK constellation points of a k-th modulated symbol can be expressed by $P(00)=P(X_k=0)*P(Y_k=0)$, $P(01)=P(X_k=0)*P(Y_k=1)$, $P(10)=P(X_k=1)*P(Y_k=0)$, and $P(11)=P(X_k=1)*P(Y_k=1)$. Each modulated symbol to be transmitted in every transmission time can be obtained by summing values obtained by multiplying the coordinates of the constellation points by the probabilities of the constellation points. That is, when the QPSK modulation scheme is assumed, each modulated symbol to be transmitted in every transmission time can be calculated by $[1,1]*P(00)+[1,-1]*P(01)+[-1,1]*P(10)+[-1,-1]*P(11)$.

If a distance between a single constellation point and the modulated symbol obtained by summing the values obtained by multiplying the coordinates of the constellation points by the probabilities of the constellation points is less than or equal to a specific value, the RS may transmit a modulated symbol corresponding to the single constellation point to the destination station at a corresponding transmission time. For example, as shown in FIG. 8, if a distance $d_{min}$ between [1,1] and the modulated symbol obtained by summing the values obtained by multiplying the coordinates of the constellation points by the probabilities of the constellation points is less than or equal to a specific value, the RS may transmit a modulated symbol corresponding to [1,1] to the destination station.

Figure 9:
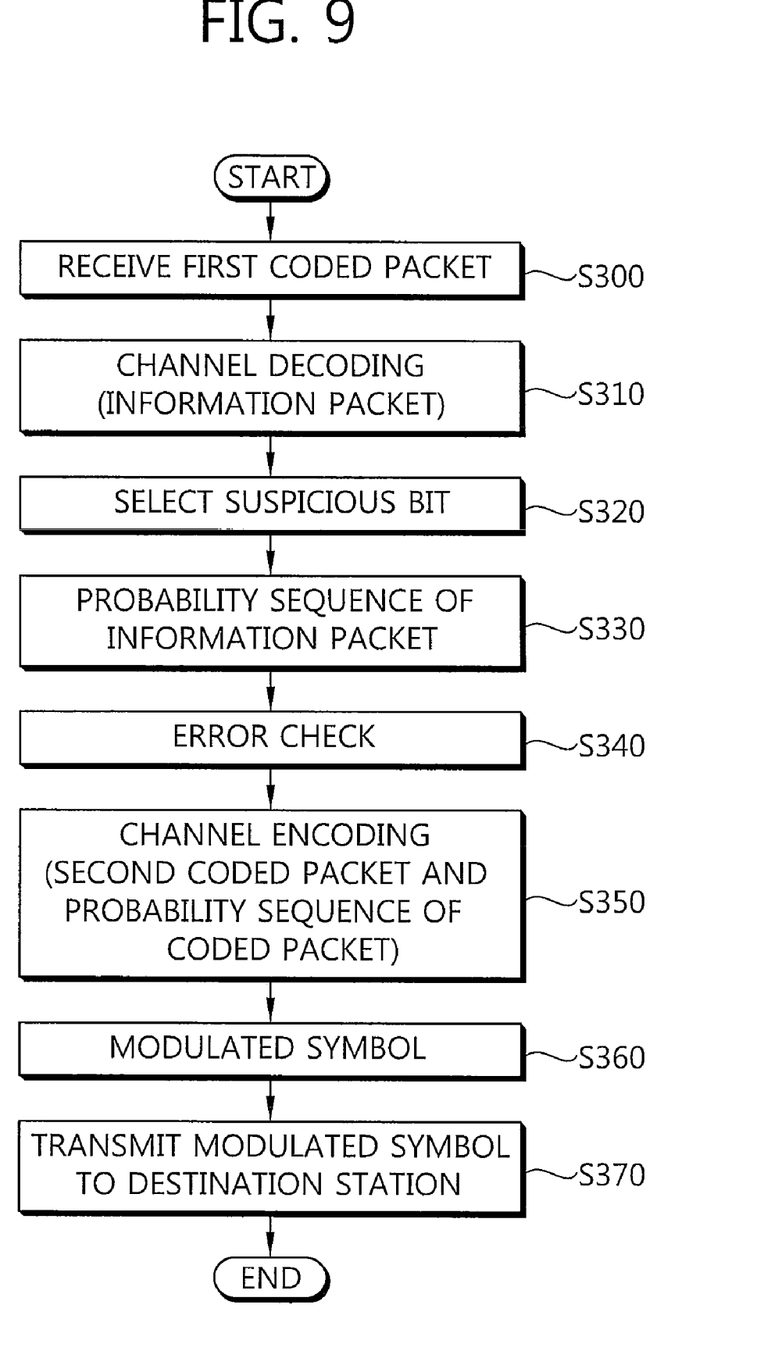
FIG. 9 is a flowchart showing an operation of a relay station according to another embodiment of the present invention.

FIG. 9 is a flowchart showing an operation of an RS according to another embodiment of the present invention.

Referring to FIG. 9, the RS receives a first coded packet from a source station (step S300), and performs channel decoding on the first coded packet (step S310). By the channel decoding process, the first coded packet is restored into an information packet consisting of information bits. In addition, the channel decoding process can be used to obtain a probability that each of information bits constituting the information packet is 0 or 1.

Next, a suspicious bit is selected from the information bits constituting the information packet restored in step S310 (step S320). For example, the suspicious bit may be selected using the probability of each information bit being 0 or 1. That is, a difference between the probability of each information bit being 0 and the probability of each information bit being 1 may be calculated so that an information bit of which the probability difference is less than or equal to a specific value is selected as the suspicious bit. Alternatively, a specific number of information bits of which a probability difference is smallest may be selected as the suspicious bit.

Next, the RS obtains a probability sequence (i.e., a first probability sequence) of the information packet (step S330). The probability sequence of the information packet may be obtained using information on the probability of each information bit being 0 or 1, which is obtained instep S310, and using the suspicious bit selected instep S320. For example, the probability of the suspicious bit being 0 and the probability of the suspicious bit being 1 may be respectively set to 0.5, and as for the remaining information bits other than the suspicious bit, a higher probability between a probability of being 0 and a probability of being 1 may be set to 1.

Next, an error of the information packet restored in step S310 is checked (step S340). Herein, parity checking, cyclic redundancy checking (CRC), header checksum, etc., can be used for error checking of the information packet.

Next, the RS performs channel encoding on the information obtained in step S310 (step S350). A second coded packet can be obtained by the channel encoding process. Further, a probability sequence of the information packet may be used to obtain a probability sequence (i.e., a second probability sequence) of the second coded packet representing a probability that each coded bit representing the second coded packet is 0 or 1.

Next, the RS obtains each modulated symbol to be transmitted in every transmission time by using the probability sequence of the second coded packet obtained in step S340 (step S360), and transmits the modulated symbol to the destination station (step S370).

The method of obtaining the probability sequence of the second coded packet in step S350 and the method of obtaining the modulated symbol in step S360 may refer to the methods described with reference from FIG. 6 to FIG. 8.

According to FIG. 9 in order for a signal received from the source station to be delivered to the destination station, the RS generates a modulated symbol according to a result of using a probability, thereby increasing reliability of error recovery. In addition, since the RS transmits to the destination station a modulated symbol suitable to a predefined MCS level and an amount of pre-allocated resources, the destination station can easily decode and restore the received signal.

Figure 10:
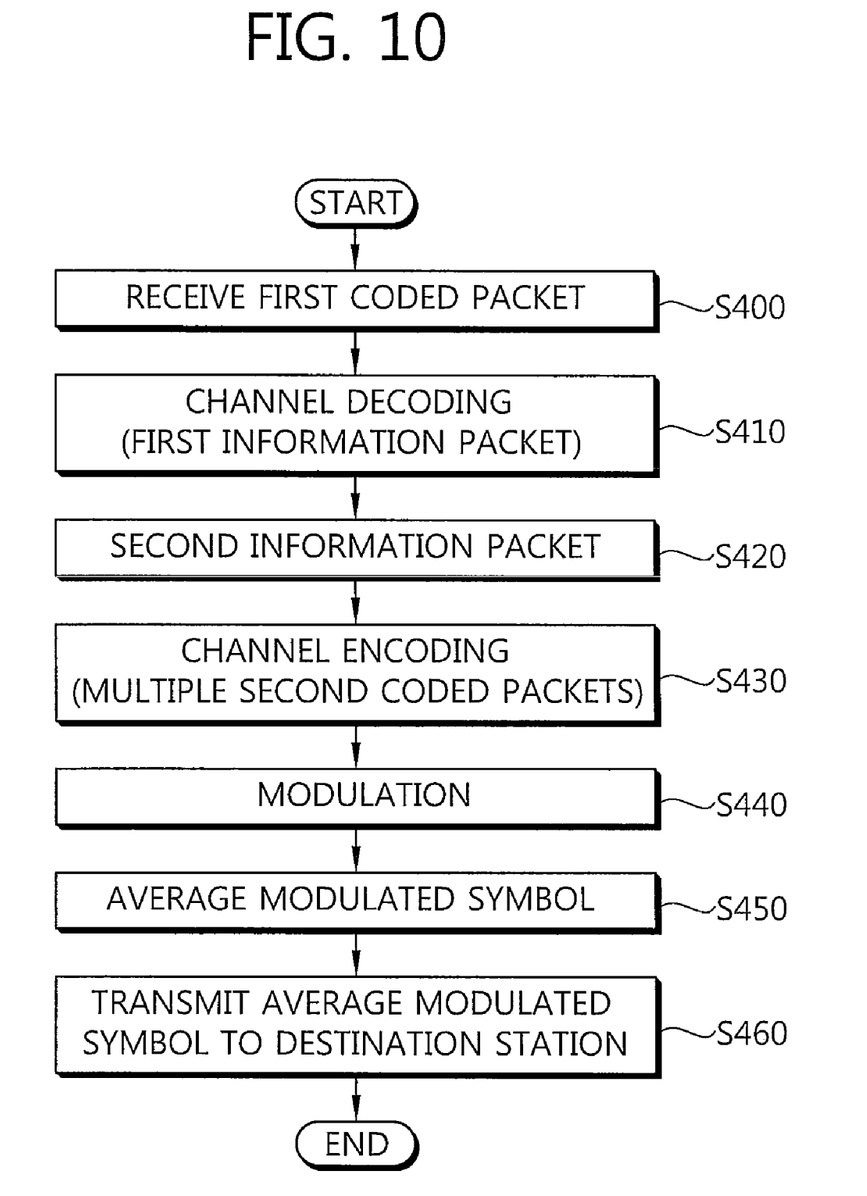
FIG. 10 is a flowchart showing an operation of a relay station according to another embodiment of the present invention.

FIG. 10 is a flowchart showing an operation of an RS according to another embodiment of the present invention.

Referring to FIG. 10, the RS receives a first coded packet from a source station (step S400), and performs channel decoding on the first coded packet (step S410). By the channel decoding process, the first coded packet is restored into a first information packet consisting of information bits. In addition, the channel decoding process can be used to obtain a probability that each of information bits constituting the information packet is 0 or 1.

Next, at least one second information packet is generated using a channel decoding result of step S410 (step S420). The second information packet can be obtained by inverting some or all of suspicious bits included in the information bits constituting the first information packet. For example, if a suspicious bit is 0, it is inverted to 1, and if the suspicious bit is 1, it is inverted to 0. With respect to the information bits constituting the first information packet, a difference between a probability of being 0 and a probability of being 1 may be calculated so that an information bit of which the probability difference is less than or equal to a specific value is selected as a suspicious bit.

The first information packet may include a plurality of suspicious bits. The second information packet may be generated by inverting some or all of the plurality of suspicious bits. Various second information packets can be generated according to a combination of the inverted suspicious bits. For example, a plurality of second information packets can be generated using a combination of two suspicious bits.

Next, channel encoding is performed on each of the first information packet and the second information packet(s) (step S430). By the channel encoding process, the first information packet and the second information packet(s) are converted into a plurality of second coded packets.

Next, the second coded packets are modulated (step S440). By modulating the second coded packets, a plurality of modulated symbols can be generated in every modulated symbol transmission time. Some of the plurality of second coded packets may be used to generate the modulated symbols. For example, only second coded packets generated by inverting two suspicious bits included in the plurality of second coded packets may be used in the generation of the modulated symbols. Alternatively, a second coded packet generated by inverting one suspicious bit included in the plurality of second coded packets may be excluded in the generation of the modulated symbols. Alternatively, only a specific number of second coded packets included in the plurality of second coded packets may be used in the generation of the modulated symbols.

Next, an average modulated symbol is obtained by averaging the plurality of modulated symbols generated in every modulated symbol transmission time (step S450).

Next, the average modulated symbol is transmitted to the destination station in every modulated symbol transmission time (step S460).

According to FIG. 10, since the RS transmits the average modulated symbol for several cases, reliability of error recovery can be increased. In addition, since a signal is transmitted even if an error occurs in a signal received from the source destination, waste of resources pre-allocated to the R-D link can be avoided.

Figure 11:
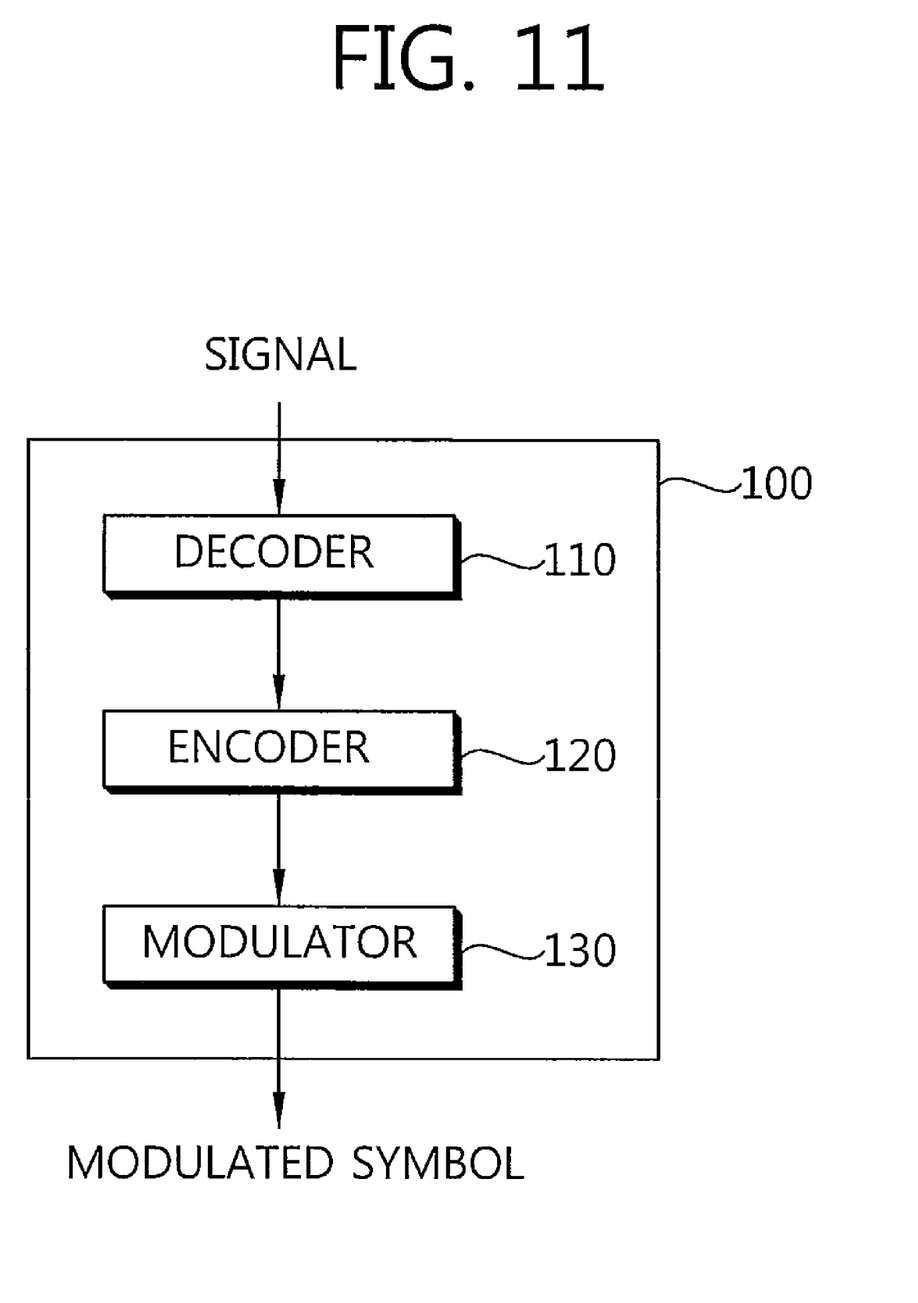
FIG. 11 is a block diagram showing a wireless relay station according to an embodiment of the present invention.

FIG. 11 is a block diagram showing a wireless RS according to an embodiment of the present invention.

Referring to FIG. 11, a wireless RS 100 may include a decoder 110, an encoder 120, and a modulator 130.

As one example, the decoder 110 of the wireless RS 100 may decode a received signal to restore the received signal into an information packet, and obtain a first probability sequence representing probability information of respective information bits constituting the information packet. The encoder 120 may encode the information packet to obtain a coded packet, and obtain a second probability sequence representing probability information of respective coded bits constituting the coded packet by using the first probability sequence. The modulator 130 may obtain a modulated symbol by using the second probability sequence.

As another example, the decoder 110 of the wireless RS 100 may decode a received signal to restore the received signal into an information packet consisting of information bits, select at least one suspicious bit from the information bits, and obtain a first probability sequence representing probability information of the suspicious bit and remaining information bits other than the suspicious bit. The encoder 120 may encode the information packet to obtain a coded packet, and obtain a second probability sequence representing probability information of respective coded bits constituting the coded packet by using the first probability sequence. The modulator 130 may obtain a modulated symbol by using the second probability sequence.

As another example, the decoder 110 of the wireless RS 100 may decode a received signal to restore the received signal into a first information packet consisting of information bits and generate at least one second information packet by inverting some or all of suspicious bits included in the information bits. The encoder 120 may encode each of the first information packet and the second information packet to generate a plurality of coded packets. The modulator 130 may modulate the plurality of coded packets to generate a plurality of modulated symbols, and obtain an average of the plurality of modulated symbols.

A relay station can properly deliver a signal to a destination station when the relay station receives an erroneous signal from a source station, when an error detection of a signal received from the source station is not possible, and when a result of error detection is not reliable. In particular, when a modulation and coding scheme (MCS) level is different between a source station-relay (S-R) link and a relay-destination station (R-D) link, a probability of error recovery can be increased by applying the different MCS level. In addition, when resources are pre-allocated to the R-D link, resources of the R-D link can be utilized even if an error occurs in the S-R link, thereby avoiding waste of resources.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of operating a relay station in a wireless communication system, the method comprising:
    decoding a received signal to restore the received signal into an information packet, and obtaining a first probability sequence representing probability information of respective information bits constituting the information packet;
    encoding the information packet to obtain a coded packet, and obtaining a second probability sequence representing probability information of respective coded bits constituting the coded packet by using the first probability sequence; and
    obtaining a modulated symbol by using the second probability sequence,
    wherein the modulated symbol is obtained by using a probability of a constellation point according to a modulation scheme predefined between the relay station and a destination station, and
    wherein the modulated symbol is obtained by summing values obtained by multiplying coordinates of respective constellation points by the probabilities of the respective constellation points.

2. The method of claim 1, wherein the second probability sequence is obtained by using any one of a convolution coder, a low density parity check (LDPC) coder, and a turbo coder.

3. The method of claim 1, wherein, if a distance between a single constellation point and a sum of values obtained by multiplying coordinates of respective constellation points by the probabilities of the respective constellation points is less than or equal to a specific value, the single constellation point is selected as the modulated symbol.

4. A method of operating a relay station in a wireless communication system, the method comprising:
    decoding received signal to restore the received signal into an information packet consisting of information bits;
    selecting at least one suspicious bit from the information bits;
    obtaining a first probability sequence representing probability information of the suspicious bit and remaining information bits other than the suspicious bit;
    encoding the information packet to obtain a coded packet and obtaining a second probability sequence representing probability information of respective coded bits constituting the coded packet by using the first probability sequence; and
    obtaining a modulated symbol by using the second probability sequence,
    wherein the modulated symbol is obtained by using a probability of a constellation point according to a modulation scheme predefined between the relay station and a destination station, and
    wherein the modulated symbol is obtained by summing values obtained by multiplying coordinates of respective constellation points by the probabilities of the respective constellation points.

5. The method of claim 4, wherein the suspicious bit is an information bit of which a difference between a probability of the bit being 0 and a probability of the bit being 1 is less than or equal to a specific value, or a specific number of information bits of which a difference between a probability of the bit being 0 and a probability of the bit being 1 is smallest.

6. The method of claim 5, wherein, in the probability information of the information bit, a probability of the suspicious bit being 0 and a probability of the suspicious bit being 1 are respectively 0.5, and, as for the remaining information bits other than the suspicious bit, a higher probability between a probability of being 0 and a probability of being 1 is set to 1.

7. A relay station of a wireless communication system, comprising:
    a decoder configured to decode a received signal to restore the received signal into an information packet, and to obtain a first probability sequence representing probability information of respective information bits constituting the information packet;
    an encoder configured to encode the information packet to obtain a coded packet, and to obtain a second probability sequence representing probability information of respective coded bits constituting the coded packet by using the first probability sequence; and
    a modulator configured to obtain a modulated symbol by using the second probability sequence,
    wherein the modulated symbol is obtained by using a probability of a constellation point according to a modulation scheme predefined between the relay station and a destination station, and
    wherein the modulated symbol is obtained by summing values obtained by multiplying coordinates of respective constellation points by the probabilities of the respective constellation points.

* * * * *